United States Patent [19]

Pike et al.

[11] Patent Number: 4,513,285
[45] Date of Patent: Apr. 23, 1985

[54] QUASI COHERENT TWO-WAY RANGING APPARATUS

[75] Inventors: Lawrence W. Pike, Salt Lake City; John W. Zscheile, Jr., Farmington; Billie M. Spencer, Bountiful, all of Utah

[73] Assignee: Sperry Corporation, New York, N.Y.

[21] Appl. No.: 289,688

[22] Filed: Aug. 3, 1981

[51] Int. Cl.³ .............................................. G01S 13/08
[52] U.S. Cl. .............................. 343/5 PN; 343/6.5 LC; 343/12 R
[58] Field of Search .................. 343/5 PN, 12 R, 7 A, 343/6.5 R, 6.5 LC, 7 PL, 17.2 PC, 17.1 R, 16 R, 5 T

[56] References Cited

U.S. PATENT DOCUMENTS

| | | | |
|---|---|---|---|
| 2,965,896 | 12/1960 | Wright et al. | 343/16 R X |
| 3,183,506 | 5/1965 | Webb | 343/12 R X |
| 3,202,968 | 8/1965 | Eady et al. | 343/5 PN X |
| 3,223,998 | 12/1965 | Hose | 343/12 R |
| 3,566,268 | 2/1971 | Webb | 343/5 PN X |
| 3,900,873 | 8/1975 | Bouvier et al. | 343/12 R |
| 3,956,749 | 5/1976 | Magorian | 343/5 PN X |
| 4,203,112 | 5/1980 | Wocher et al. | 343/17.1 R X |
| 4,325,138 | 4/1982 | Zscheile, Jr. | 343/5 PN X |
| 4,357,609 | 11/1982 | Spencer | 343/12 R |

Primary Examiner—Maynard R. Wilbur
Assistant Examiner—Brian Steinberger
Attorney, Agent, or Firm—John B. Sowell; Kenneth T. Grace; Marshall M. Truex

[57] ABSTRACT

An accurate radio frequency ranging system is provided for measuring the time required for a signal to be transmitted from a ground station to a remote station and to be returned to the ground station. The ground station is provided with a master reference clock that is employed to drive a first pseudonoise generator. The ranging system in the ground station is started by a unique and predetermined start epoch signal produced by the first pseudonoise generator. The first pseudonoise generated signals are transmitted to the remote station where they are tracked and sensed. When the original start epoch signal is sensed at the remote station, it is employed as a trigger or read signal to initiate the generation of a stop epoch signal. The stop epoch signal is retransmitted to the ground station and stored in a register where it is compared with pseudonoise generated signals being retransmitted from the remote station to the ground station. When the correlation between the two signals occurs, a new epoch stop signal is produced which stops the timing of the ranging system in the ground station. Since the pseudonoise generated signals transmitted from the remote station to stop the ranging system in the ground station are not locked on to the pseudonoise signals being transmitted from the ground station to the remote station, there is no requirement for turn-around coherency.

6 Claims, 3 Drawing Figures

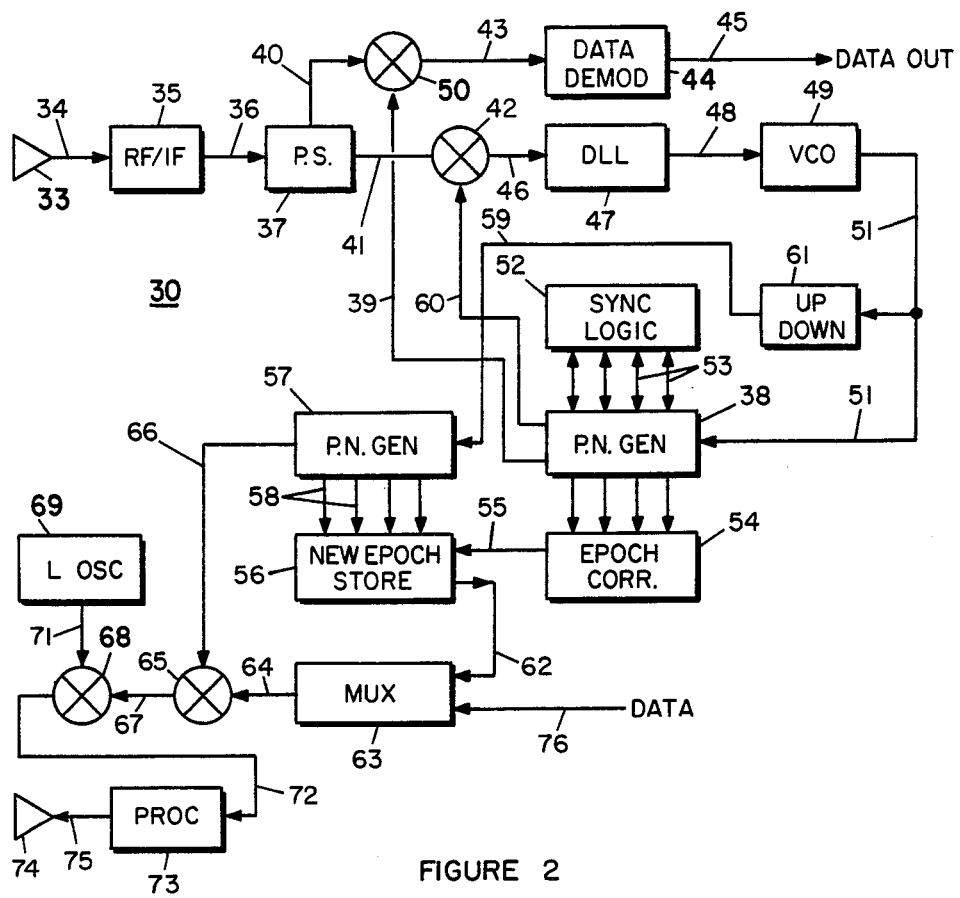
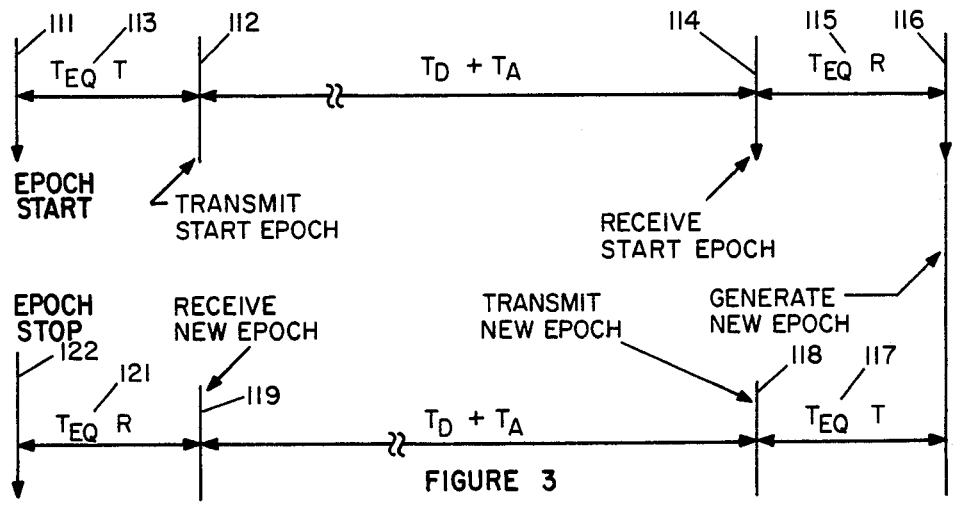
FIGURE 2
FIGURE 3

QUASI COHERENT TWO-WAY RANGING APPARATUS

BACKGROUND OF THE INVENTION

1. Field of the Invention

This invention relates to radio frequency ranging apparatus. More particularly, the apparatus relates to an improved two-way ranging system for determining the range between a ground station and a remote station without the requirement for turnaround coherency.

2. Description of the Prior Art

This invention is an improvement in the apparatus shown and described in application Ser. No. 180,737 filed Aug. 25, 1980, now U.S. Pat. No. 4,347,009 for a Noncoherent Two-Way Ranging Apparatus. This previous application describes apparatus and a method of performing two-way range measurements in approximately half the acquisition time of prior art coherent systems. This previous application explains that ranging systems have been conveniently divided into classifications depending on the coding employed. One of the most desirable and secure types of codes involves the utilization of a pseudonoise generated spread spectrum code. When such codes are made non-linear they can be very secure means of transmitting codes and data. Such codes are desirable because they are capable of transmitting information in a sequence of patterns that resemble a random noise pattern. Such random noise patterns are difficult to distinguish from random occurring signals. Pseudonoise generated spread spectrum codes have been employed to transmit codes and data for a long enough time that sophisticated computer analysis techniques have been developed for deciphering the unique pattern sequences. When attempts are made to intercept and analyze spread spectrum generated codes, the period of intercept is preferably made long enough to build up a reliable analysis of the intercepted information. The number of unique patterns in a pseudonoise generated spread spectrum code are $2^{n-1}$ in length and "n" is an integer. This code sequence is normally made long enough to cause difficulties in intercepting and deciphering the sequence and as a result increases the acquisition time for receiving the information.

In a coherent ranging system, a pseudonoise generated signal is transmitted from a first station to a second station and the second station employs means for tracking and locking on to the signal. The time initially required for the pseudonoise generator in the receiving station to track and lockon to the incoming pseudonoise generated signal is referred to as acquisition time. It is only when the code is acquired and locked on that the pseudonoise generated information at the receiving station is synchronized with the coded signal being received so that transmission of data is possible.

One of the problems with spread spectrum codes is that the acquiring station must examine each unique signal for a period of time and build up reliability of the signal being received. When the pseudonoise generated signal being received is out of synchronization with the pseudonoise generator in the receiving station, the control logic at the receiving station must step the tracking system generator to another unique signal in the spread spectrum code. The receiving station must continue to step the tracking system generator until the received pseudonoise generated signal matches the pseudonoise generated signal in the receiving station. Once the receiving station system is locked on to the transmitted signal it is said to be coherent. In some of the prior art ranging systems the received signal is processed in the remote station and retransmitted back to the ground station where the retransmitted signal must be reacquired to provide coherent lock-on of the retransmitted signal. Thus, it will be understood that in two-way ranging systems when the remote station locks on to the receive signal and retransmits the receive signal to the ground station so that the ground station can reacquire and lock-on to the transmitted signal that the two-way ranging system is said to be completely coherent. The aforementioned application's Ser. No. 180,737 describes a ranging system in which the spread spectrum transmitted coded signals are tracked by a tracking generator in the remote station. The remote station pseudonoise generator produces a replica of the original pseudonoise generated code. This tracking generator locks on to the transmitted signal and thus requires acquisition time in one direction. Since this previous application ranging system did not retransmit the acquired signal there was no requirement for two-way or turn-around coherency. This previous application achieved noncoherency by employing a second master clock and a second ranging system in the remote station. The range determined at the remote station was transmitted to the ground station in order to make a determination of the two-way range. This transmission of range data was made over the communications link.

The present invention improvement completely eliminates the need for a second master clock and a second ranging system in the remote station yet provides an accurate two-way ranging system which operates in the same or less acquisition time than the aforementioned application Ser. No. 180,737 apparatus. Before this previous application apparatus was provided, two-way ranging had been performed through coherent turn-around of a marker signal. In coherent turn-around systems, the receive spread spectrum signal is demodulated employing a pseudonoise generated replica signal at the remote station which must be synchronized and in phase with the receive pseudonoise generated waveform signal. The received marker signal is processed (i.e., turn-around) and retransmitted back to the ground station where it is demodulated employing a pseudonoise generated replica signal of the code being retransmitted. This pseudonoise generated replica sequence signal must also be demodulated by employing a pseudonoise generated replica which is locked on to the retransmitted waveform from the remote station. When coherent turn-around systems are employed for making ranging measurements, the remote station must first acquire and lock on to the original signal and after the remote station has acquired the ground station signal, it may then retransmit the processed signal back to the ground station which again requires reacquisition of the retransmitted signal. Coherent turn-around systems require that both stations be locked on to the waveform being transmitted from the other station, thus, the acquisition time for coherent turn-around systems require substantial acquisition time.

It will be understood that range measurements between stations can be calculated by measuring the time an electromagnetic signal takes to travel from a ground station to a remote station and make the return trip to the ground station. With complete knowledge of the delays encountered by the transmitting equipment and the receiving equipment in the two stations an accurate range determination can be made. It is well known that the delays in the equipment can be accurately measured before the remote station is placed in operation.

It would be extremely desirable to provide a ranging system which is secure and is not easily jammed. Further, it would be desirable to provide a ranging system which employs simple and reliable components of the type already employed in ranging systems and which would be arranged to operate in a manner which reduces the acquisition time.

SUMMARY OF THE INVENTION

It is a principal object of the present invention to provide an improved quasi or partially coherent ranging system.

It is another primary object of the present invention to provide a novel ranging system embodying a ground station ranging device having the master clock and a remote station employing a tracking clock.

It is another object of the present invention to reduce the acquisition time for a ranging system used in combination with spread spectrum codes.

It is yet another object of the present invention to provide a ranging system which requires no time or range measurement at the remote station and yet retains the full ranging accuracy of the more complex systems.

It is another object of the present invention to provide a quasi coherent ranging system in which the pseudonoise generated rates of transmission at the remote station may be varied so that they are harmonically related to the pseudonoise generated rates at the ground station.

According to these and other objects of the present invention, there is provided a ground station and a remote station. Each station is provided with two pseudonoise generating elements. The first pseudonoise generator is driven by the master clock in the ground station. The signal produced by the first pseudonoise generator is transmitted to the remote station and is demodulated by a second pseudonoise generator in the remote station. The second pseudonoise generator in the remote station is driven by a tracking clock signal. A third pseudonoise generator in the remote station is also driven by the tracking clock signal but is not synchronized with and locked on to the second pseudonoise generator signal. One of the unique pseudonoise generated signals is employed as a start epoch and when it is recognized at the ground station, it is employed to start the ranging system. This unique epoch is transmitted to the remote station and when received and recognized at the remote station, it is employed as a read signal to read the state of the third pseudonoise generator and the state of the third pseudonoise generator is employed as a new epoch. The new epoch is transmitted to the ground station and stored in a register and the output signals from the third pseudonoise generator are retransmitted to the ground station where they are tracked by a fourth pseudonoise generator. When the signals from the fourth pseudonoise generator match the new epoch that has been transmitted from the remote station, a signal is produced which stops the range timing measurement in the ranging apparatus of the ground station. The elapsed time between the start of the ranging apparatus and the stopping of the ranging apparatus is equal to the time required for the signals to make the round trip between the ground station and the remote station plus the time lost in the equipment in the ground station and the remote station. Subtracting out the equipment delays leaves a time indicative of the range between the ground station and the remote station.

BRIEF DESCRIPTION OF THE DRAWINGS

FIG. 2 is a block diagram showing the elements of a range measuring system employed in a second station or remote station; and FIG. 3 is a timing diagram showing the typical start and stop times for the range measuring system of FIGS. 1 and 2.

DESCRIPTION OF THE PREFERRED EMBODIMENT

Figure 1:
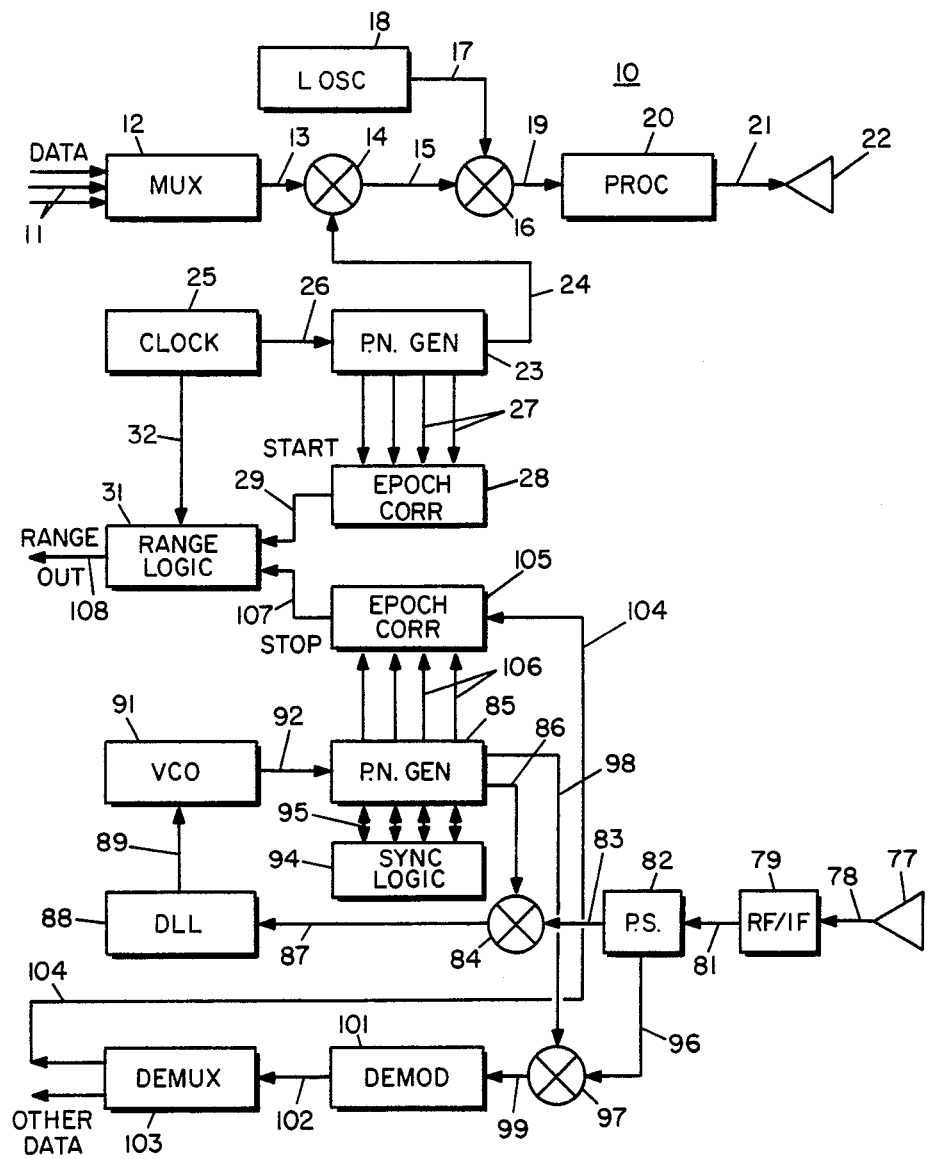
FIG. 1 is a block diagram showing the elements of a range measuring system employed in a first station or ground station.

Refer now to FIG. 1 showing in block diagram the preferred elements employed in a ground station for transmitting spread spectrum pseudonoise generated signals to the remote station. Ground station 10 is shown having lines of data 11 applied to the input of multiplexer 12 to selectively produce the input signals on output line 13 to mixer 14. The output of mixer 14 on line 15 contains the data on one of the input lines 11 to the exclusion of the other lines. The input data on line 15 is applied to mixer 16 and is modulated by the signals on line 17 from local oscillator 18. The modulated output on line 19 is applied to a processor and transmitter 20 and is connected to the transmitting antenna 22 via line 21.

It will be understood that the data on line 11 being selectively applied to line 13 and to mixer 14 is modulated and encoded by the output of pseudonoise generator 23 being applied to mixer 14 via line 24. The pseudonoise generated code on line 24 comprises a balance of ones and zeros which are preferably generated in a random sequence that has no identifiable pattern or data contained in the code patterns. The first pseudonoise generator 23 is preferably a linear feedback type shift register which is driven by a square wave or sign wave clock signal. The master clock 25 supplies a suitable signal on line 26 to pseudonoise generator 23. It will be understood that the spread spectrum pseudonoise generated signals on line 24 may be transmitted via antenna 22 without having data encoded from line 13 thereon.

The pseudonoise generator 23 produces a plurality of unique patterns or words which contain cells or bits. These unique binary words may contain a great number of bits which will increase the sequence length and thus increase the security of the code being transmitted but also increases the acquisition time as will be explained in detail hereinafter. Pseudonoise generator 23 repeats the same sequence of words in the same order so it is possible to detect a predetermined word combination of the output on line 27 with an epoch correlator 28 or equivalent device. When a predetermined epoch or marker word is detected in epoch correlator 28, a start or epoch marker is generated on line 29 which is applied to range counter 31 to start the range measurement at station 10 by counting clock pulses being applied to the range counter via line 32. Assume that the range logic 31 in FIG. 1 has been started. Refer now to FIG. 2 which shows the remote station 30.

Signals being transmitted from antenna 22 in the ground station 10 are received at antenna 33 of the remote or airborne station 30. The spread spectrum pseudonoise generated coded signals are applied via line 34 to the processor 35 for heterodyned radio frequency signals down to an intermediate frequency. The hetrodyned signals on line 36 are applied to power splitter 37 so that data may be processed separately from the pseudonoise generated signals. The hetrodyned spread spectrum signals on line 40 are applied to mixer 50. The output signals from pseudonoise generator 38 on line 39 are also applied to mixer 50 to provide correlated output signals on line 43. The signals on line 43 are applied to a data demodulator 44 so that data on line 43 can be recovered to provide a data output on line 45. It will be understood that the data being supplied to remote station 30 are applied for stations command functions. The spread spectrum pseudonoise generated signals on line 41 are applied to mixer 42 where they are correlated by signals from the second pseudonoise generator 38 on line 60. The correlated output signals on line 46 are applied to a delay lock loop 47 to provide an analog voltage input on line 48 to the voltage controlled oscillator 49. The output of voltage controlled oscillator 49 on line 51 is a tracking clock signal similar to the clock signals from clock 25 in station 10. This tracking clock signal on line 51 is applied to the second pseudonoise generator 38 to drive the generator in timed sequence with the pseudonoise generated signal being received on line 36. Thus it will be understood that when pseudonoise generator 38 is locked on to the incoming signal on line 36 that the two signals are in phase and locked on. In order to achieve the acquisition of the signal on line 36 and to lock on to this signal, it is necessary to step the second pseudonoise generator 38 sequentially until the desired lock-on is achieved. Sync logic 52 and connecting lines 53 are provided for this purpose. Assuming that the second pseudonoise generator 38 is locked on to the incoming signal, epoch correlator 54 can sense the pattern or word being generated at pseudonoise generator 38 and when the unique and predetermined start epoch occurs it will be recognized by the epoch correlator 54 which generates a read or recognition signal on line 55 which is applied to the new epoch storage register 56. The trigger signal on line 55 instructs register 56 to store whatever unique pattern is being presented at the output of the third pseudonoise generator 57 on lines 58. The third pseudonoise generator 57 is driven by clock signals on line 59. Since pseudonoise generator 57 is not required to be synchronized with pseudonoise generator 38, there is no requirement that generator 57 be driven at the same speed as generator 38. Accordingly, there is provided an up-down logic element 61 which can either increase or decrease the tracking clock signal frequency on line 51 by multiplying or dividing the input signal by an interger. Thus, so long as the clock signal on line 59 is at an even harmonic of the clock signal on line 51 the ranging system is entirely operable and need not be driven at the same frequency. Higher frequencies of operation of pseudonoise generator 57 will permit larger amounts of information to be transmitted from the remote station.

If the third pseudonoise generator 57 is driven at the same speed or a harmonic of the tracking clock signal speed then the output on line 58 which is applied to the storage register 56 can be read by the trigger or read signal on line 55. This output signal stored in register 56 is in effect a new epoch which will be employed as a stop signal. The new epoch signal on line 62 is applied to a multiplexer 63 and via output line 64 to a mixer 65.

The mixer 65 is modulated and encoded by the output of the third pseudonoise generator 57 on line 66 so that the signal on line 67 to mixer 68 may be further modulated by local oscillator 69 via line 71. The spread spectrum pseudonoise generated encoded signal on line 72 is processed and amplified in processor 73 and applied to antenna 74 via line 75 for transmission back to the ground station 10. It will be understood that additional data may be applied to the multiplexer 63 via line 76 for transmission back to the ground station 10. Further, when no data is being applied on line 64 to mixer 65, the pseudonoise generated signal on line 66 is continuously being applied to line 67 for transmission from the transmitting antenna 74 back to the ground station 10.

Signals from transmitting antenna 74 in FIG. 2 are being received by receiving antenna 77 of FIG. 1. The signals received from station 30 at antenna 77 are applied to processor 79 via line 78 for heterodyning the radio frequency signals down to intermediate frequency. The heterodyned signals on line 81 are applied to power splitter 82 so that data may be processed separately from the pseudonoise generated signals. The spread spectrum pseudonoise generated signals on line 83 are applied to mixer 84 where they are correlated by signals from the fourth pseudonoise generator 85 on line 86. The correlated signal on line 87 is applied to a delay lock loop 88 to produce an analog signal on line 89 which is applied to the voltage controlled oscillator 91. The output of voltage controlled oscillator 91 is a tracking clock signal which is applied via line 92 to the fourth pseudonoise generator 85 to keep it synchronized with the incoming pseudonoise signal being received on line 83. In order to provide means for stepping the pseudonoise generator 85 to lock it on the incoming signal, there is provided in the first station or ground station sync logic 94 having input-output lines 95 connected to the pseudonoise generator 85. It will be understood that when the pseudonoise generator 85 is not locked on to the incoming signal, the sync logic 94 will step the pseudonoise generator 85 until it is locked on and will maintain if locked on to the incoming signal.

Assume that the fourth pseudonoise generator 85 was already locked on to the incoming signal at antenna 77. Further assume that the second pseudonoise generator 38 was locked on to its incoming signal at antenna 33. Under these conditions the new epoch which was stored in storage register 56 is stabilized as a unique epoch and has been transmitted from the transmitting antenna 74 of the remote station 30 to receiving antenna 77 of the ground station 10. This new epoch is processed as data and passes through the power splitter 82 via line 96 to mixer 97. The modulated data on line 96 is demodulated at mixer 97 by the pseudonoise generated signal on line 98 from generator 85. This demodulated signal on line 99 is further processed by demodulator 101 and produces an output data signal on line 102 which is applied to the demultiplexer 103. Thus, the new epoch stored in register 56 of remote station 30 is presented at the output of demultiplexer 103 on line 104 and is stored in the epoch correlator 105. When the new epoch stored in epoch correlator 105 matches the same new epoch unique signal generated at the fourth pseudonoise generator 85 and presented via line 106, a signal is produced on line 107 which is applied to the range logic 31 to produce a range determination on output line 108.

It will be understood that the signals being generated by pseudonoise generator 85 are kept locked on the pseudonoise generated signals being received at antenna 77 by the voltage controlled oscillator 91 and that the replica sequence being transmitted is a pseudonoise spread spectrum code which permits the transmission of weak spectral signals that may be accurately decoded over a period of time by the epoch correlator 105.

Refer now to FIG. 3 which shows in timing chart form the sequence of real time events which occur at stations 10 and 30. Assume that the range determination is being made and that the master clock 25 is driving the first pseudonoise generator 23 to produce modulated pseudonoise generated signals at antenna 22. When the predetermined epoch appears at pseudonoise generator 23, it is transmitted via lines 27 to the epoch correlator 28 to produce the epoch start signal on line 29 which is applied to the range logic 31. This start epoch time is illustrated at point 111 and the same start epoch unique pattern is transmitted from antenna 22 at a point in time 112 after incurring the time equipment delays and transmission delays shown at point 113. Transmission of the start epoch pattern or signal incurs both transmission time delays ($T_d$) and atmospheric ($T_a$) so that the delayed original start epoch is received at antenna 33 of station 30 at point 114. After incurring time delays due to the equipment of the receiver as shown at point 115 the epoch correlator 54 generates a read or trigger signal on line 55 at a point in time 116. Assuming that the new epoch stored in register 56 has been transmitted to the ground station 10 and stored in epoch correlation register 105, the third pseudonoise generator 57 continues its sequence of operations and continues to generate its signals on its output line 66 to transmitting antenna 74, thus incurring transmission equipment time delays shown at point 117. The new epoch in this sequence of signals is shown being transmitted at time 118. This new epoch which is being continuously generated by the third pseudonoise generator 57 incurs time delays due to transmission distance and atmospheric conditions and is received at receiving antenna 77 at point in time 119 where it incurs further equipment time delays in the receiving apparatus noted at point 121. When this new epoch signal arrives at the receiving apparatus and is in sync with the fourth pseudonoise generator 85, its presence is detected by the epoch correlator 105 via lines 106. The epoch correlator produces the new epoch stop signal on line 107 as shown in point of time at point 122. It can be seen from FIG. 3 that the range logic 31 was started by the epoch start signal at time 111 and stopped by the epoch stop signal at time 122. By subtracting out the time delays due to the transmitting equipment as shown at points 113 and 117 and subtracting out the time delays due to the receiving equipment as shown at points 115 and 121 the remaining time is equal to twice the time delay due to transmission through the atmosphere plus twice the atmospheric time delays. The atmospheric time delays can be accurately determined and subtracted out leaving a count or time factor which is the turnaround time required for the pseudonoise signal to go from the ground station 10 to the remote station 30 and back to the ground station 10.

Having explained a preferred embodiment of the present invention with reference to the timing chart FIG. 3, it will be understood that modifications to the preferred embodiment equipment can be made and still employ the same mode of operation employed by the preferred embodiment structure shown in FIGS. 1 and 2. For example, the apparatus employed for tracking and locking on the signals being received by the two stations can be modified without changing the mode of operation. The feature of the present invention is that the second station, shown in FIG. 2, provides tracking means for locking on to the first station's pseudonoise generated signal and provides a synchronized tracking clock signal on line 51 so that the epoch detector 54 at the remote station can detect the original epoch signal and generate a read or trigger signal on line 55 for generating a new epoch signal stored in epoch storage means 56. Since the pseudonoise generator 57 is not in sync with the pseudonoise generator 38, the new epoch stored in epoch storage means 56 is not the same as, or related to, the original start epoch which is detected by the epoch correlation means 54.

It is now apparent that the second pseudonoise generator 38 is in sync with and locked on to the signal produced by the first pseudonoise generator 23 and that the fourth pseudonoise generator 85 is in sync with and locked on to the third pseudonoise generator 57. However, there is no requirement for any correlation or synchronization between the second pseudonoise generator 38 and the third pseudonoise generator 57, thus, there is no coherency required between these generators. As long as the second pseudonoise generator 38 and third pseudonoise generator 57 are kept in step or harmonic relation to each other, which is assured by the tracking clock signal on lines 51 and 59, there will be an accurate range determination made by the range logic 31. A refinement and greater accuracy can be made to the range determination by employing range phase detecting means which are known in the prior art and do not constitute a part of this invention.

We claim:

1. Apparatus for determining the range between the first station and a second station by measuring the time required for radio frequency signals to be transmitted between the stations without turn-around coherency, the combination comprising:

a first pseudonoise generator for generating a plurality of unique coded signals, a stable master clock for driving said first pseudonoise generator, first station start epoch detecting means coupled to said first pseudonoise generator for detecting a predetermined one of said unique coded signals and for generating an epoch marker start signal, a ranging system at said first station coupled to said epoch marker start signal, first station transmitting means coupled to said first pseudonoise generator, second station receiving means adapted to receive the transmitted first station pseudonoise generated signals, second station tracking means coupled to said second station receiving means for locking-on said first station pseudonoise generated signals and for generating second station synchronized clock signals, said second station tracking means comprising a second pseudonoise generator driven by said second station synchronized clock signal and for locking-on said first station pseudonoise generated signals, second station detecting means for detecting the presence of said predetermined one of said unique coded signals and for simultaneously generating a new epoch read signal, a third pseudonoise generator driven by said synchronized clock signals without being synchronized with said second pseudonoise generator, second station transmitting means coupled to said third pseudonoise generator, first station receiving means adapted to receive the second station transmitted signals from said third pseudonoise generator, first station tracking means coupled to said first station receiving means for locking-on said second station pseudonoise generated signals and for generating first station synchronized clock signals, said first station tracking means comprising a fourth pseudonoise generator driven by said first station synchronized clock signals for locking-on said second station pseudonoise generated signals, first station stop epoch detecting means coupled to said fourth pseudonoise generator and said ranging system for detecting a new epoch and for generating a stop signal, new epoch storage means responsive to said new epoch read signal from said second station detecting means for reading and storing a new unique coded signal from said third pseudonoise generator into said new epoch storage means to provide a new epoch signal, said new epoch storage means being coupled to said second station transmitting means for selectively transmitting said new epoch signal to said first station receiving means and said first station stop epoch detecting means, said new epoch signal being transmitted from said second station to said stop epoch detecting means in said first station and being stored and compared with the output signals from said fourth pseudonoise generator until said output signals compare with said stored new epoch to produce a new epoch stop signal, and said ranging system comprising ranging logic being started by said epoch marker start signal and being stopped by said new epoch stop signal, whereby the time duration between said epoch start signal and said new epoch stop signals is indicative of the range between said stations.

2. Apparatus as set forth in claim 1 wherein said second station tracking means comprises, a delay lock loop, a voltage controlled oscillator driven by said delay lock loop, said voltage controlled oscillator having an output providing said second station synchronized clock signals coupled to said second and said third pseudonoise generators, and synchronizing logic coupled to said second pseudonoise generator for locking said second pseudonoise generator on said first station pseudonoise transmitted signals.

3. Apparatus as set forth in claim 2 wherein said second and said third pseudonoise generators at said second station are coupled to the output of said voltage controlled oscillator, said second pseudonoise generator being coupled to said second station detecting means which comprises an epoch correlation detector for detecting said predetermined one of said unique coded signals received from said first station and generating a new epoch read signal, said third pseudonoise generator being coupled to said new epoch storage means which stores the new unique coded signal being generated by said third pseudonoise generator in response to said new epoch read signal from said second station detecting, said second and said third pseudonoise generators being out of epoch synchronization so that said new epoch signal is not predetermined and is not related to said epoch marker start signal being received at said second station tracking means.

4. Apparatus as set forth in claim 1 wherein said first station tracking means comprises, a delay lock loop, a voltage controlled oscillator driven by said delay lock loop, said voltage controlled oscillator having an output providing said first station synchronized clock signals, and synchronizing logic coupled to said fourth pseudonoise generator for locking said fourth pseudonoise generator on said second station pseudonoise transmitted signals.

5. Apparatus as set forth in claim 4 wherein said first station and said second station receiving means further comprise first and second mixer means coupled respectively to said first and said second station tracking means.

6. Apparatus as set forth in claim 5 wherein said first station receiving means further comprises a power splitter, a third mixer coupled to said power splitter, a demodulator circuit coupled to said second mixer, and a demultiplexer coupled to said demodulator for selectively routing said new epoch signal to said stop epoch detecting means.

* * * * *